(12) United States Patent
Etling (10) Patent No.: US 8,201,856 B2
(45) Date of Patent: Jun. 19, 2012

(54) FLUSH-MOUNTED LATCHING ASSEMBLY

(75) Inventor: Keith A. Etling, Shiloh, IL (US)

(73) Assignee: The Boeing Company, Chicago, IL (US)

( * ) Notice: Subject to any disclaimer, the term of this patent is extended or adjusted under 35 U.S.C. 154(b) by 870 days.

(21) Appl. No.: 12/198,767

(22) Filed: Aug. 26, 2008

(65) Prior Publication Data

US 2010/0051748 A1  Mar. 4, 2010

(51) Int. Cl.
*E05C 19/00* (2006.01)
(52) U.S. Cl. ...................................... 292/1; 292/DIG. 37
(58) Field of Classification Search .................. 292/252, 292/1, DIG. 4, DIG. 31, DIG. 37; 244/129.4; 49/355, 356
See application file for complete search history.

(56) References Cited

U.S. PATENT DOCUMENTS

| | | | |
|---|---|---|---|
| 3,571,977 A | 3/1971 | Abeel | |
| 4,176,812 A | 12/1979 | Baker | |
| 4,183,564 A | 1/1980 | Poe | |
| 4,220,364 A | 9/1980 | Poe | |
| 4,231,597 A | 11/1980 | Pelcin | |
| 4,820,094 A * | 4/1989 | Hirakui et al. | 410/107 |
| 5,029,917 A * | 7/1991 | Szerlag et al. | 292/347 |
| 5,058,937 A | 10/1991 | Miehe et al. | |
| 5,137,260 A | 8/1992 | Pehr | |
| 5,570,915 A | 11/1996 | Asadurian | |
| D452,952 S | 1/2002 | Teskey | |
| 6,626,473 B1 * | 9/2003 | Klein et al. | 292/347 |
| 6,668,602 B2 | 12/2003 | Graham | |
| 6,696,652 B1 * | 2/2004 | Spies | 200/61.62 |
| 7,057,124 B2 * | 6/2006 | Ieda et al. | 200/61.62 |
| 7,272,964 B2 | 9/2007 | Graham | |
| 7,273,991 B2 * | 9/2007 | Korultay et al. | 200/61.62 |
| 7,442,892 B2 * | 10/2008 | Ishiguro | 200/329 |
| 7,518,072 B2 * | 4/2009 | Yoda | 200/61.62 |
| 2004/0119294 A1 | 6/2004 | Long | |

OTHER PUBLICATIONS

Ball Pin Locks; http://carrlane.com/catalog/index.cfm/ 26825071F0B221118070C1C512D020609090C0015482013180B-041D1E173C3B28535742; Oct. 21, 2011, 1 page.

* cited by examiner

*Primary Examiner* — Gary Estremsky
(74) *Attorney, Agent, or Firm* — Armstrong Teasdale LLP (57) ABSTRACT

A latch assembly for a door is provided. The latch assembly includes a force actuated locking mechanism having a depressable actuator, a sleeve coupled to an inside surface of the door, wherein the sleeve includes a cylindrical opening configured to receive at least a portion of the force actuated locking mechanism therein and maintain the force actuated locking mechanism with respect to the door. The latch assembly also includes a flexible membrane oriented such that the depressable actuator is operable through the flexible membrane.

20 Claims, 8 Drawing Sheets

FLUSH-MOUNTED LATCHING ASSEMBLY

BACKGROUND OF THE DISCLOSURE

The field of the disclosure relates generally to latching assemblies, and more specifically to substantially flush, push-button latching assemblies having a sealed latch cavity.

In some aircraft or similar vehicles where space is limited, such as buses, motor-homes, automobiles, trains, boats, etc., it is desirable to provide a latching device that can be mounted flush with an external surface of the vehicle. Such flush-mounted latches eliminate the need to provide additional space to accommodate handles or knobs used to operate conventional door latching devices. Flush mounting is also desirable from a safety standpoint since it eliminates protruding knobs or handles. Flush mounting is also desirable to provide a smooth aerodynamic surface to reduce drag caused by protruding features and/or breaks around the flush mount.

Some know flush-mounted latches are based upon a retractable handle design. Most commonly, a hinged actuator handle or lever is pivotably mounted within a recessed cavity in the door. In the retracted position, the handle lies substantially flush with the door outer surface. During operation, the handle is swung outward from the door surface to release the latch mechanism, allowing the door to be pushed or pulled to its open position. At least one known latching mechanism includes a latching device for cabinet doors having a swingably retractable handle. Some other known latch designs require the handle to be swung outward from the door surface and then either turned or rotated to release the latch mechanism. However, such latching devices may be subjected to a variety of excessive loading conditions by operators, resulting in frequent handle and latch mechanism failure making such designs undesirable for commercial aircraft and similar uses. Moreover, the inherent nature of such latching devices may require a certain degree of strength and dexterity to operate the latch. Additionally, such a design does not provide a sealed latch cavity that would facilitate the prevention of contamination entering the latch cavity.

Another known flush-mounted latch design, having no exposed operating provisions, is known in the stereo cabinet industry. In such a design, the latching of a glass cabinet door is accomplished by pushing the door against a spring-loaded latch which retains a magnet at its tip. The door is equipped with a corresponding ferromagnetic plate that is drawn to the magnet to retain the door when it is in its closed position. When the door is pushed in and then released, the latch springs outward accelerating the door away from the cabinet. When the latch reaches its end-of-travel, an inertial force is created in the door sufficient to break the magnetic force retaining the door, allowing it to swing free. However, such magnetic-type latch designs may not provide a positive lock, such that a closed door may be forced open without first releasing the latch. This characteristic may be highly undesirable on aircraft external surfaces and similar applications, since a door opening during flight may be undesirable. Moreover, the vibrational and shock forces generated in an aircraft may exceed the retaining forces present in most magnetic latches. Additionally, such a design does not provide a sealed latch cavity that would facilitate the prevention of latch component jamming due to contamination entering the latch cavity.

It would be advantageous to provide a flush mounted latch for use on aircraft that uses a flexible membrane positioned over a locking mechanism to provide a smooth external surface while still enabling a user to actuate the locking mechanism. It would also be advantageous to provide a sealed latch cavity with a smooth conductive aerodynamic surface.

SUMMARY

One aspect is directed to a latch assembly for a door. The latch assembly includes a force actuated locking mechanism having a depressable actuator, a sleeve coupled to an inside surface of the door, wherein the sleeve includes a cylindrical opening configured to receive at least a portion of the force actuated locking mechanism therein and maintain the force actuated locking mechanism with respect to the door. The latch assembly also includes a flexible membrane oriented such that the depressable actuator is operable through the flexible membrane.

Another aspect is directed to an access door. The access door includes an aperture that extends between a door inner surface and a door outer surface, and a latch assembly. The latch assembly includes a force actuated locking mechanism having a depressable actuator, a sleeve coupled to an inside surface of the door, wherein the sleeve includes a cylindrical opening configured to receive at least a portion of the force actuated locking mechanism therein and maintain the force actuated locking mechanism with respect to the door. The latch assembly also includes a flexible membrane oriented such that the depressable actuator is operable through the flexible membrane.

Yet another aspect is directed to a method for fabricating a latch assembly for a door. The method includes extending an aperture between a door inner surface and a door outer surface, coupling a receptacle along the door inside surface, wherein the receptacle is configured to receive at least a portion of a force actuated locking mechanism therein, and slidably inserting the locking mechanism into the receptacle, covering the door outer surface with a fairing compound such that the inserted locking mechanism is fixedly held within the receptacle, and forming a substantially smooth surface between the cover and an adjacent door surface.

DETAILED DESCRIPTION

Figure 1:
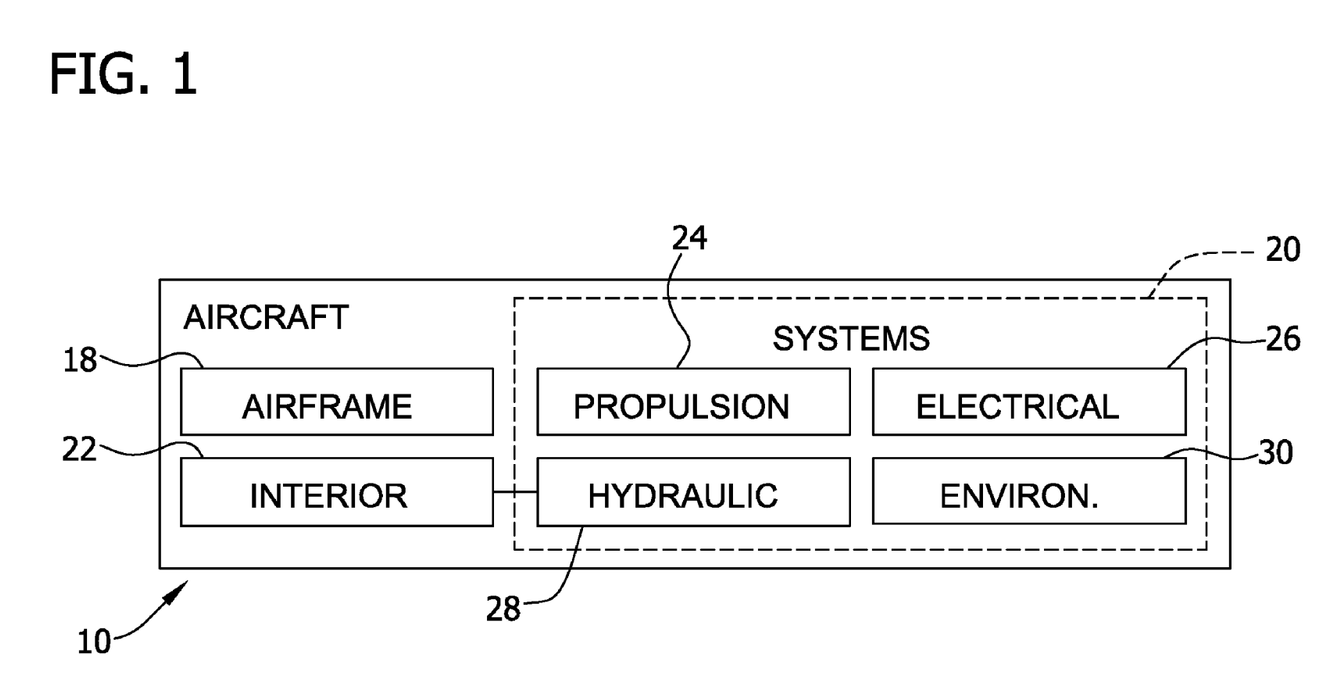
FIG. 1 is a schematic illustration of an exemplary latch assembly including a locking mechanism shown in an unlocked configuration.

Referring more particularly to the drawings, embodiments of the disclosure may be described in the context of an aircraft 10 as shown in FIG. 1. As shown in FIG. 1, the aircraft 10 include an airframe 18 with a plurality of systems 20 and an interior 22. Examples of high-level systems 20 include one or more of a propulsion system 24, an electrical system 26, a hydraulic system 28, and an environmental system 30 which, in the exemplary aircraft 10, may be included within interior 22. Any number of other systems may be included. Although an aerospace example is shown, the principles of this disclosure may be applied to other industries, such as the automotive industry.

Figure 2:
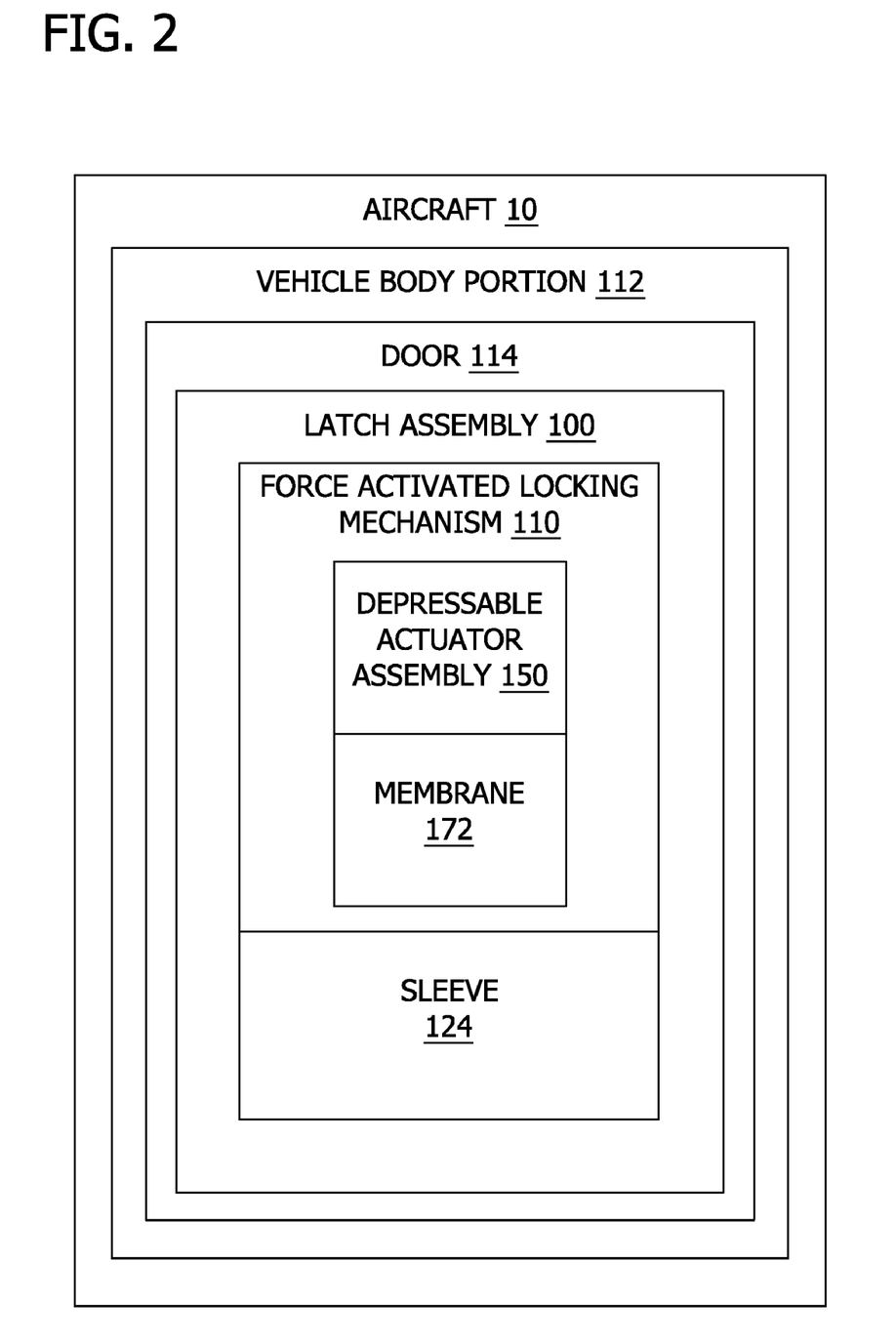
FIG. 2 is a functional block diagram of the aircraft shown in FIG. 1 including a latch assembly.

FIG. 2 is a functional block diagram of at least a portion of the aircraft shown in FIG. 1 including a latch assembly 100. Aircraft 10 includes a vehicle body portion 112 that includes door 114. In the exemplary embodiment, door 114 includes a force actuated locking mechanism 110 and a sleeve 124, as will be described in more detail herein. Additionally, force actuated locking mechanism includes a depressable actuator assembly 150, and a flexible membrane 172, as will be described in more detail herein.

Figure 3:
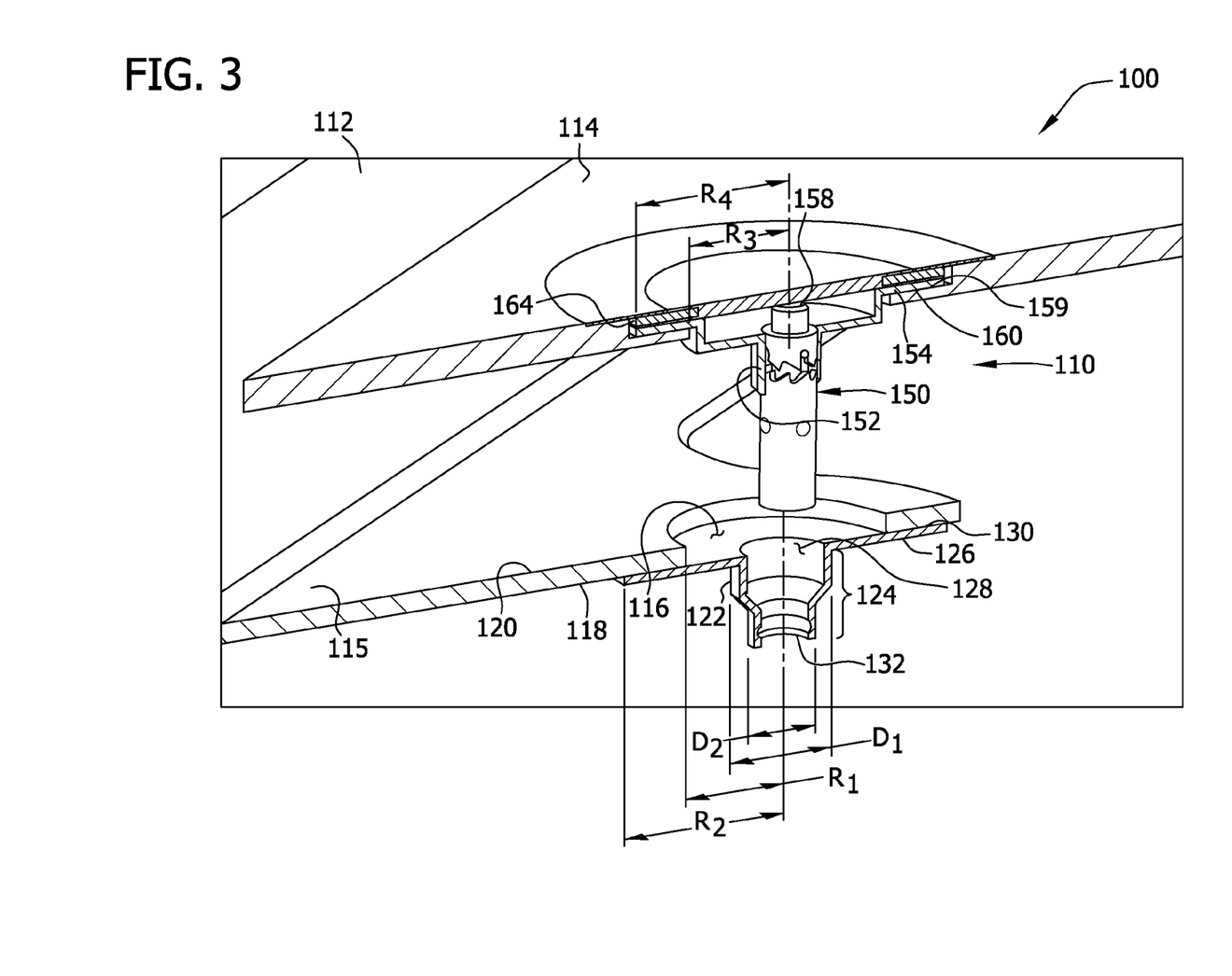
FIG. 3 is a schematic illustration of the latch assembly in a locked configuration.
Figure 4:
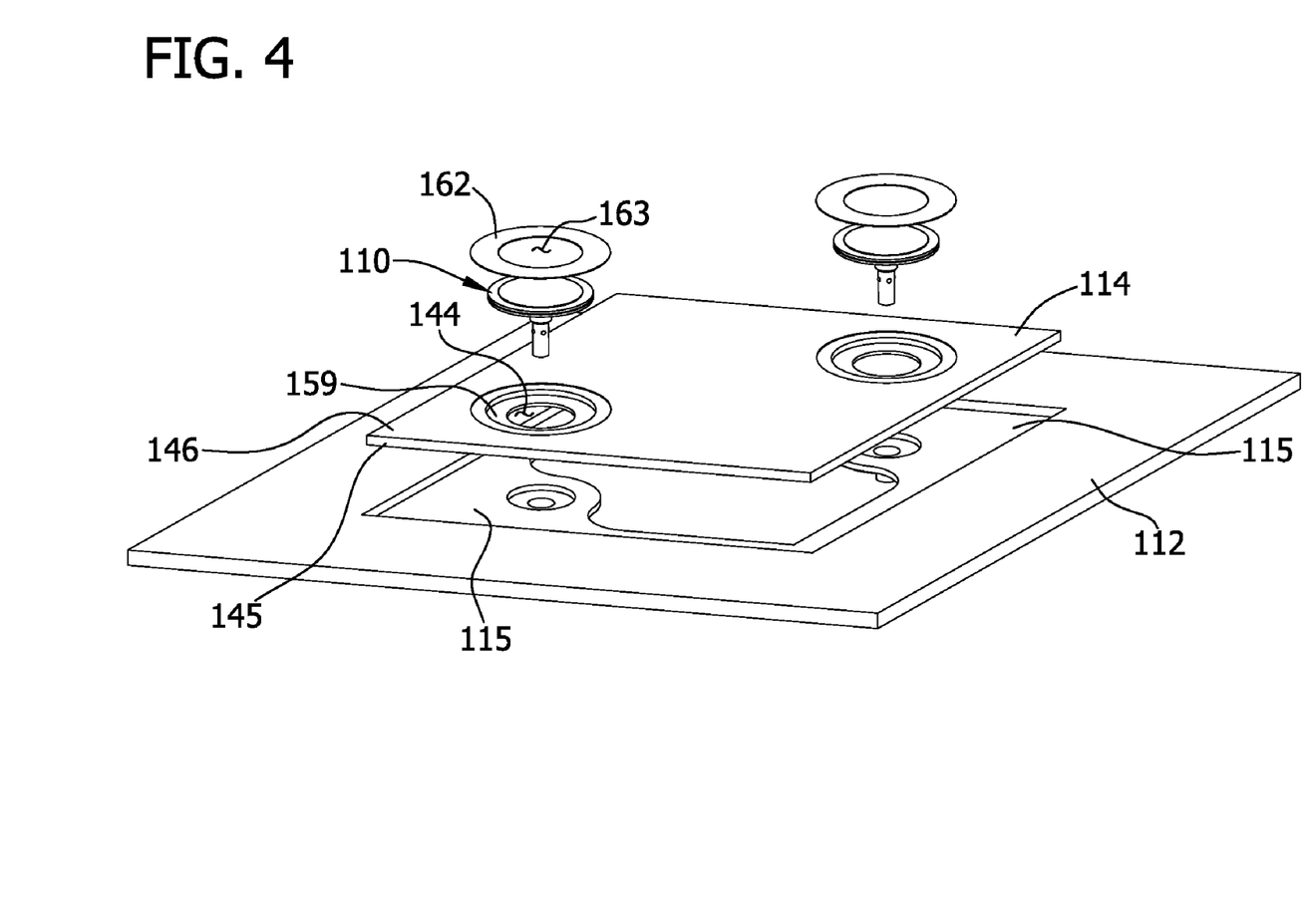
FIG. 4 is an exploded view of latch assembly shown in FIG. 2.
Figure 5:
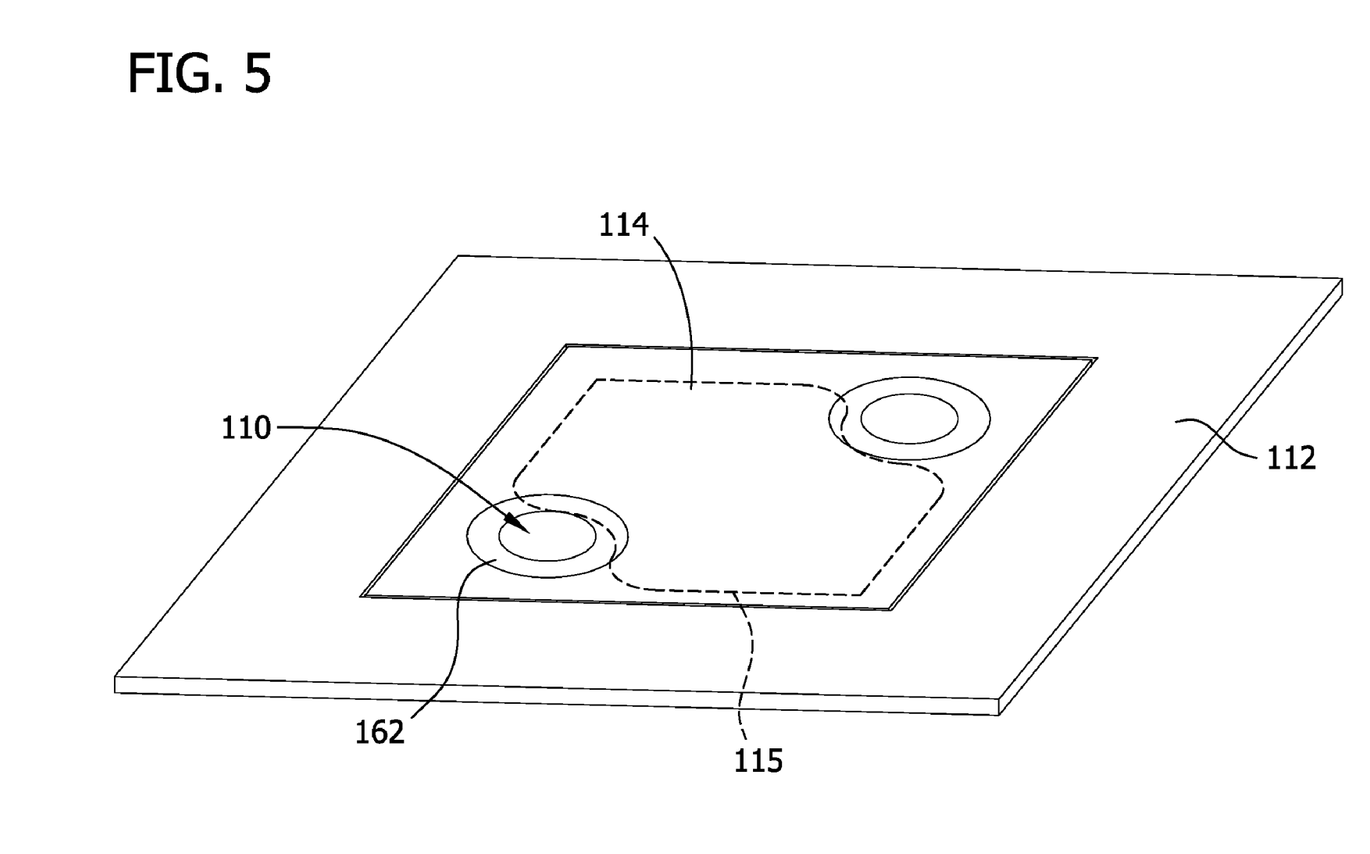
FIG. 5 is a perspective view of aircraft with a door in a closed configuration.
Figure 6:
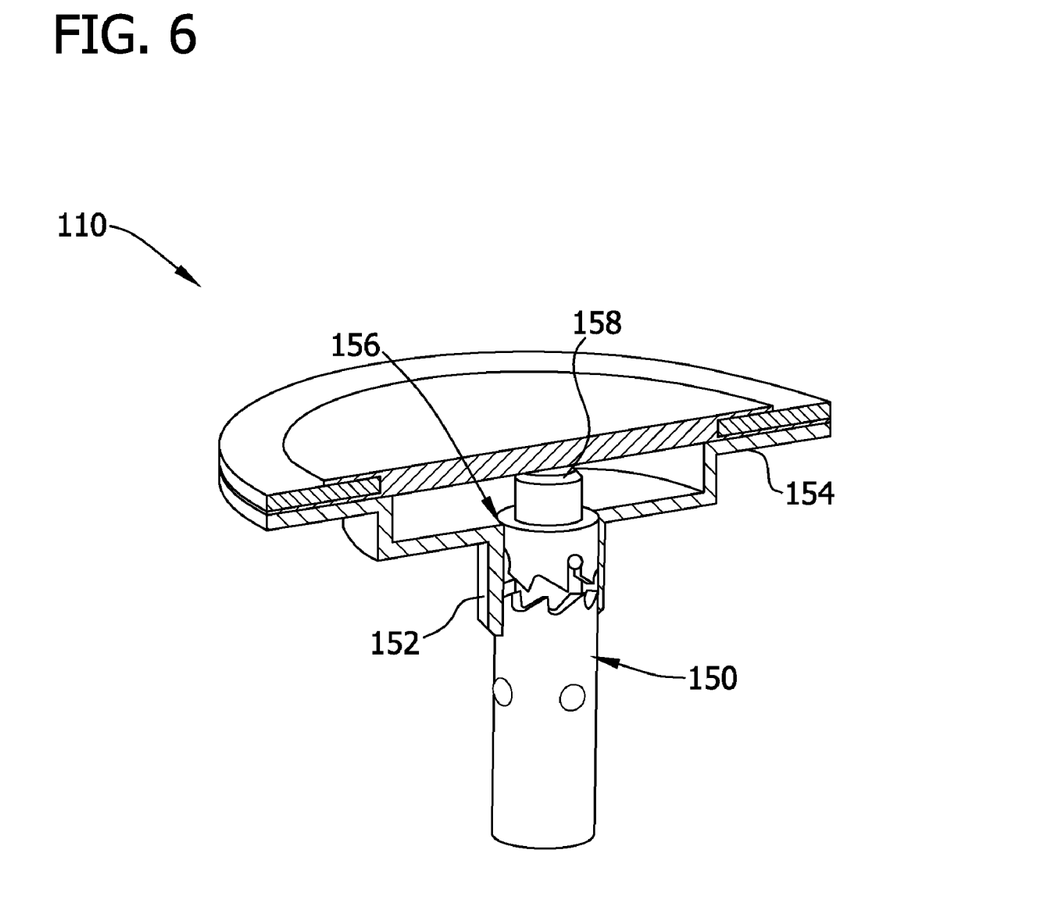
FIG. 6 is a schematic illustration of an exemplary force actuated locking mechanism.

FIG. 3 is a schematic illustration of an exemplary latch assembly 100 including a force actuated locking mechanism 110 shown in a disengaged configuration. FIG. 4 is an exploded view of latch assembly 100 shown in FIG. 2. FIG. 5 is a perspective view of aircraft 10 with a door 114 in a closed configuration. FIG. 6 is a schematic illustration of an exemplary force actuated locking mechanism 110. A vehicle body portion 112 is provided against which a door 114 is to be latched. In the exemplary embodiment, body portion 112 is an aircraft fuselage skin. In the exemplary embodiment, body portion 112 includes a recessed surface 115 that receives door 114 therein such that a flush surface is defined between door 114 and body portion. Alternatively, body portion 112 may be any surface against which door 114 is to be latched as described herein, such as, but not limited to an external surface of an automobile or a boat. Recessed surface 115 includes an aperture 116 therethrough that passes from an internal surface 118 of recessed surface 115 to an external surface 120 of recessed surface, wherein aperture 116 includes a radius $R_1$.

In the exemplary embodiment, a receptacle 122 is coupled to internal surface 118, and includes a substantially cylindrical sleeve 124 (shown in FIG. 3) and a flange 126 that extends radially outward from a receiving end 128 of receptacle 122. Flange 126 engages internal surface 118 such that a mating surface 130 is formed between flange 126 and internal surface 118, and includes a radius $R_2$ that is greater than radius $R_1$. Sleeve 124 extends axially away from flange 126 and mating surface 130. In the exemplary embodiment, sleeve receiving end 128 includes a first diameter $D_1$ which tapers to a distal end 132 diameter $D_2$. In the exemplary embodiment, receptacle 122, and therefore sleeve 124 is axially aligned with aperture 116. Alternatively, receptacle 122 is coupled to internal surface 118 in any configuration that enables latch assembly 100 to function as described herein.

In the exemplary embodiment, door 114 is provided with an aperture 144 passing therethrough from an internal surface 145 to an external surface 146 of door 114, wherein aperture 144 includes a radius $R_3$. A force actuated locking mechanism 110 is coupled to the external surface 146 of door 114. Referring now to FIG. 4, locking mechanism 110 includes a push button actuator assembly 150, a substantially cylindrical sleeve 152 and a flange 154 that extends radially outward from a receiving end 156 of sleeve 152. In the exemplary embodiment, push button actuator assembly 150 is a ball lock latch that includes a button 158 that moves locking mechanism 110 from a locked position to an unlocked position, and from an unlocked position to a locked position, as described in more detail herein. Alternatively, actuator assembly 150 is any locking-type latch mechanism that enables latch assembly 100 to function as described herein. In the exemplary embodiment, flange 154 engages external surface 146 of door 114 at a recess 159 and includes a radius $R_4$ that is wider than radius $R_3$, such that a mating surface 160 is formed between flange 154 and recess 159. Sleeve 152 extends axially outward from flange 154 and mating surface 160. In the exemplary embodiment, locking mechanism sleeve 152 is sized to receive push-button actuator assembly 150 therein, wherein push-button actuator assembly 150 is oriented such that the actuator, i.e. button 158, extends into aperture 144.

In the exemplary embodiment, latch assembly 100 includes a fairing compound 162 that is substantially circular in shape and includes an aperture 163 therethrough. Fairing compound 162 is positioned over an interface 164 formed between flange 154 and door external surface 146 such that interface 164 (shown in FIG. 2) is flush and provides a smooth aerodynamic surface, thereby reducing drag, as described in more detail herein.

Figure 7:
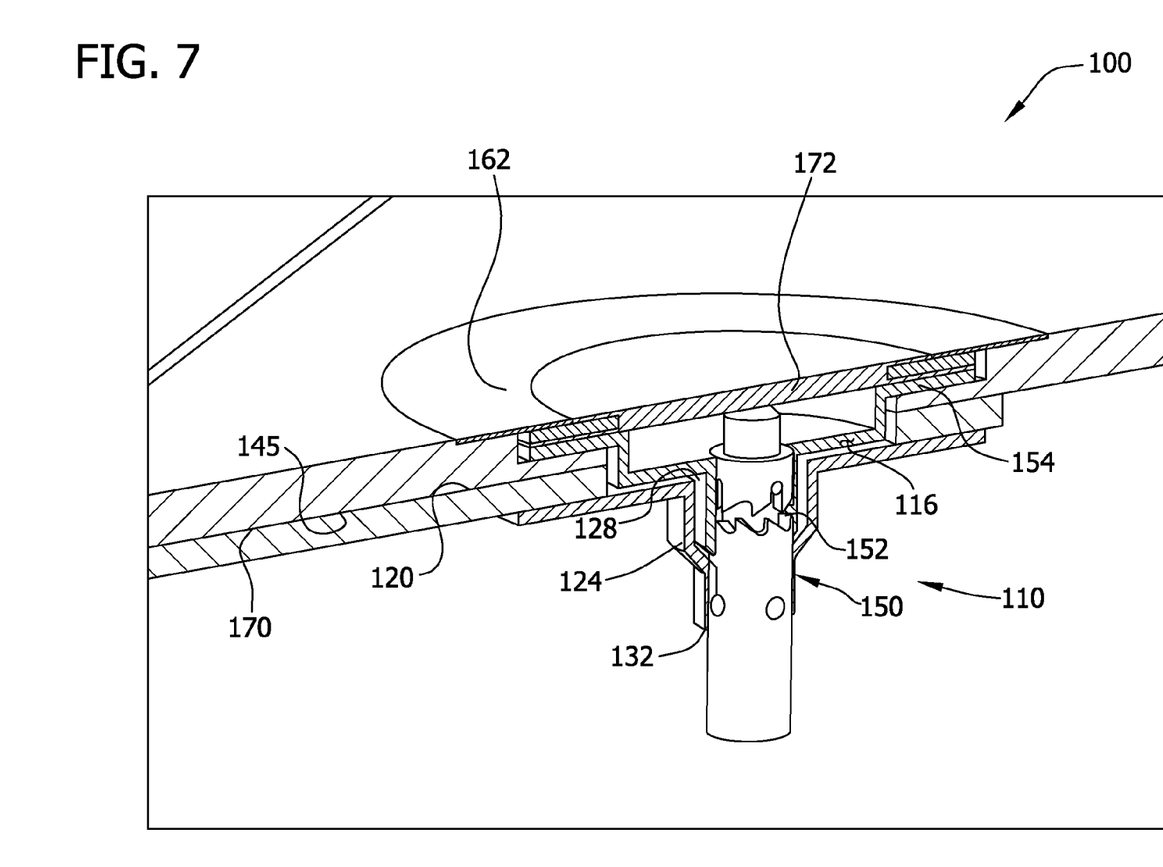
FIG. 7 is a schematic illustration of latch assembly in a locked configuration.

FIG. 7 is a schematic illustration of latch assembly 100 in a locked configuration. In the exemplary embodiment, receptacle sleeve 124 receives locking mechanism 110 therein. More specifically, actuator assembly 150 and cylindrical sleeve 152 are received into distal end 132 and receiving end 128, respectively. Additionally, as door 114 is closed, flange 154 is received within aperture 116, such that body portion external surface 120 contacts door internal surface 145 to form a contact surface 170.

A membrane 172 is provided that extends across at least a portion of latch assembly 110 and forms a flush surface thereon. More specifically, membrane 172 entirely encloses actuator assembly 150. In the exemplary embodiment, membrane 172 is fabricated from a stretchable, conductive, elastomeric material configured to provide a substantially flush surface with the surrounding door when fairing compound 162 is positioned thereon. Alternatively, membrane may be any material that enables the latching assembly 100 to function as described herein.

Referring to FIG. 7, force actuated locking mechanism 110 is accessible to lock and unlock door 114 by depressing though membrane 172. More specifically, actuator assembly is actuated by depressing button 158. This action disengages locking mechanism 110. In the exemplary embodiment, push button actuator assembly 150 is a ball lock latch that, when depressed, disengages sleeve 124 to enable removal of door 114 from body portion 112.

Figure 8:
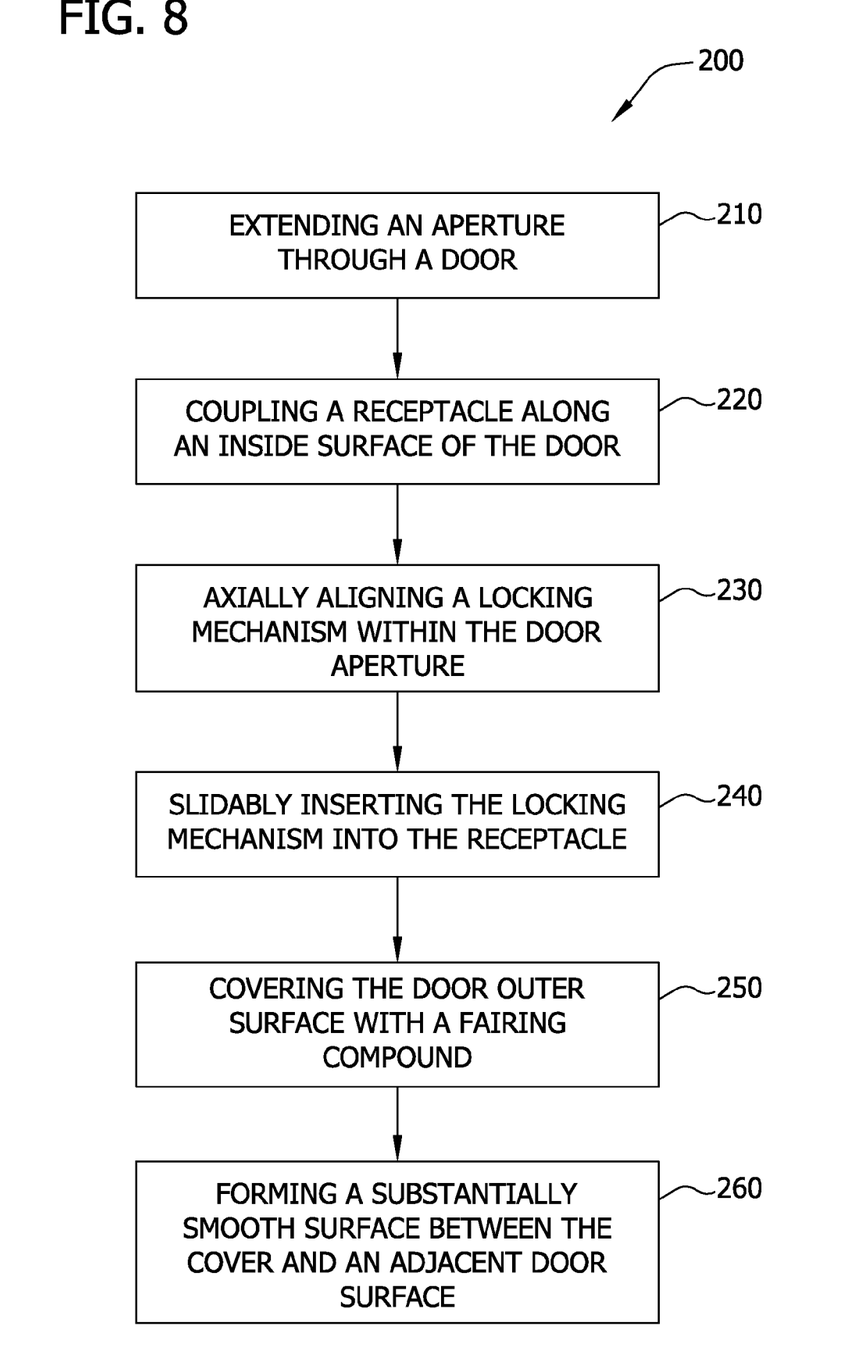
FIG. 8 is a flow diagram of an exemplary method for fabricating a latch assembly for a door.

FIG. 8 is a flow diagram of an exemplary method 200 for fabricating a latch assembly for a door. In the exemplary embodiment, method 200 includes extending 210 an aperture between a door inner surface and a door outer surface, and axially aligning 220 the locking mechanism within the door aperture. Furthermore, method 200 includes coupling 230 a receptacle along the door inside surface, wherein the receptacle is configured to receive at least a portion of a force actuated locking mechanism therein. Coupling 230 the receptacle along the door inner surface includes extending a flange radially outward from a sleeve configured to receive the locking mechanism therein and coupling the flange to the inside surface of the door. In the exemplary embodiment, method 200 includes slidably inserting 240 the locking mechanism into the receptacle and covering 250 the door outer surface with a fairing compound such that the inserted locking mechanism is fixedly held within the receptacle. In the exemplary embodiment, method 200 includes forming 260 a substantially smooth surface between the cover and an adjacent door surface and sealing the latch assembly within the receptacle such that the latch assembly is protected from external contaminants.

Exemplary embodiments for flush-type latching assemblies for use on vehicle external surfaces are described in detail above. The above-described assemblies include an elastomeric, flexible membrane positioned over a locking mechanism to provide a smooth external surface while still enabling a user to actuate the locking mechanism. Moreover, this system is particularly useful for maintaining a smooth aerodynamic surface of the vehicle. The system described herein combines a sealed latch cavity with a smooth conductive aerodynamic surface to enhance survivability of the vehicle while providing an easy to use locking assembly.

Although the foregoing description contains many specifics, these should not be construed as limiting the scope of the present disclosure, but merely as providing illustrations of some of the presently preferred embodiments. Similarly, other embodiments of the disclosure may be devised which do not depart from the spirit or scope of the present disclosure. Features from different embodiments may be employed in combination. The scope of the disclosure is, therefore, indicated and limited only by the appended claims and their legal equivalents, rather than by the foregoing description. All additions, deletions and modifications to the disclosure which fall within the meaning and scope of the claims are to be embraced thereby.

As used herein, an element or step recited in the singular and proceeded with the word "a" or "an" should be understood as not excluding plural elements or steps, unless such exclusion is explicitly recited. Furthermore, references to "one embodiment" of the present disclosure are not intended to be interpreted as excluding the existence of additional embodiments that also incorporate the recited features.

This written description uses examples to describe the disclosed embodiments, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A latch assembly for a door coupled to an aircraft skin, said assembly comprising:
   a force actuated locking mechanism comprising:
      a depressable actuator; and
      a flexible membrane, said depressable actuator operable through said flexible membrane; and
   a sleeve coupled to an inside surface of the skin, said sleeve comprising a cylindrical opening configured to receive at least a portion of said force actuated locking mechanism therein and maintain a position of said force actuated locking mechanism with respect to the door.

2. A latch assembly in accordance with claim 1, wherein said force actuating mechanism comprises a ball lock latch.

3. A latch assembly in accordance with claim 1, wherein the aircraft skin comprises an aperture, said force actuated mechanism substantially axially aligned with said aperture when received within said sleeve, said actuator at least partially received within said aperture.

4. A latch assembly in accordance with claim 3, wherein said force actuated locking mechanism comprises a flange configured to be received within a door aperture substantially axially aligned with said aperture of said aircraft skin.

5. A latch assembly in accordance with claim 1, wherein said flexible membrane is configured to form a seal around said latch assembly.

6. A latch assembly in accordance with claim 1, wherein said sleeve further comprises a flange extending radially outward from said sleeve, said receptacle flange coupled to an inside surface of the door.

7. A latch assembly in accordance with claim 1, further comprising a fairing compound comprising an aperture substantially axially aligned with said force actuated locking mechanism.

8. A latch assembly in accordance with claim 7, wherein said fairing compound is configured to form a substantially smooth surface between said flexible membrane and the door.

9. A system comprising:
   an aircraft skin;
   an access door including an aperture that extends between a door inner surface and a door outer surface; and
   a latch assembly comprising:
      a force actuated locking mechanism comprising:
         a depressable actuator; and
         a flexible membrane, said depressable actuator operable through said flexible membrane; and
      a sleeve coupled to an inside surface of the aircraft skin, said sleeve comprising a cylindrical opening configured to receive at least a portion of said force actuated locking mechanism therein and maintain a position of said force actuated locking mechanism with respect to the access door.

10. A system in accordance with claim 9, wherein said force actuating mechanism comprises a ball lock latch.

11. A system in accordance with claim 9, wherein said force actuated locking mechanism comprises a flange configured to be received within said aperture.

12. A system in accordance with claim 9, wherein said flexible membrane is configured to form a seal around said latch assembly.

13. A system in accordance with claim 9, wherein said sleeve comprises a flange extending radially outward from said sleeve, said receptacle flange coupled to said door inner surface.

14. A system in accordance with claim 9, further comprising a fairing compound comprising an aperture substantially axially aligned with said force actuated locking mechanism.

15. A system in accordance with claim 14, wherein said fairing compound is configured to form a substantially smooth surface between said flexible membrane and the door.

16. A method for fabricating a latch assembly for a door, the method comprising:
   extending an aperture between a door inner surface and a door outer surface;
   coupling a receptacle along the door inner surface, the receptacle configured to receive at least a portion of a force actuated locking mechanism therein;
   slidably inserting the force actuated locking mechanism into the receptacle;
   covering the door outer surface with a fairing compound such that the inserted force actuated locking mechanism is fixedly held within the receptacle; and
   forming a substantially smooth surface between a flexible membrane and one of the door inner surface and the door outer surface.

17. A method in accordance with claim 16, wherein forming a substantially smooth surface further comprises sealing the latch assembly within the receptacle such that the latch assembly is protected from external contaminants.

18. A method in accordance with claim 16, wherein coupling a receptacle along the door inside surface further comprises:

extending a flange radially outward from a sleeve configured to receive the force actuated locking mechanism therein;

coupling the flange to the door inner surface.

19. A method in accordance with claim 18, further comprising axially aligning the force actuated locking mechanism within the aperture.

20. A method for fabricating a latch assembly for an aircraft door, the method comprising:

extending an aperture between a door inner surface and a door outer surface;

axially aligning a force actuated locking mechanism within the aperture;

coupling a receptacle along the door inside surface, the receptacle configured to receive at least a portion of a force actuated locking mechanism therein, and further comprising extending a flange radially outward from a sleeve configured to receive the force actuated locking mechanism therein;

coupling the flange to the door inner surface;

slidably inserting the force actuated locking mechanism into a receptacle coupled along the door inner surface;

covering the door outer surface with a fairing compound such that the inserted force actuated locking mechanism is fixedly held within the receptacle; and forming a substantially smooth surface between a flexible membrane and one of the door inner surface and the door outer surface to facilitate sealing the latch assembly within the receptacle such that the latch assembly is protected from external contaminants.

* * * * *